Dec. 24, 1935.   J. HIRSHFELD   2,025,106
WARNING SIGNAL AND CONTROL FOR ROAD VEHICLES
Filed June 8, 1932   2 Sheets-Sheet 1
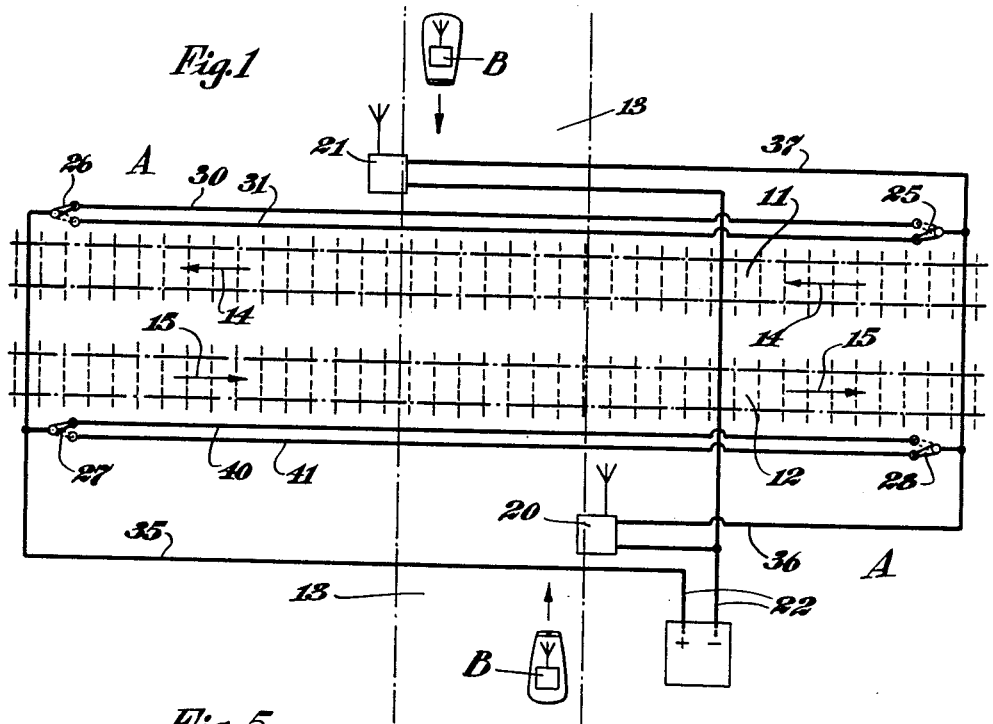
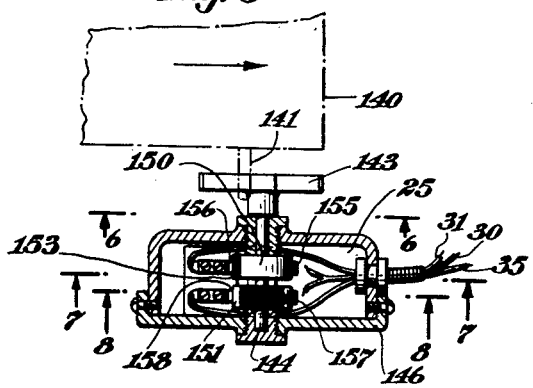
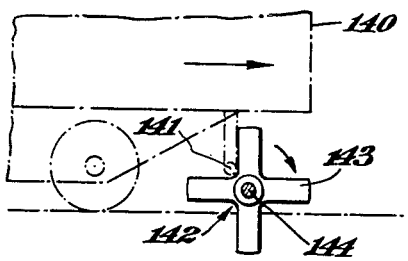
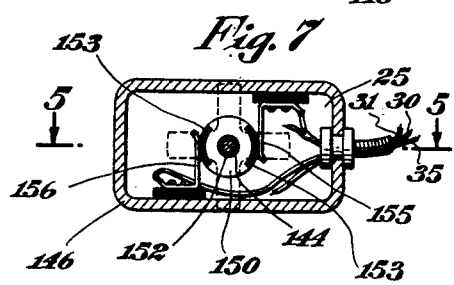
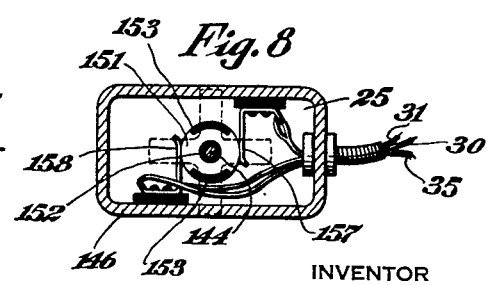
INVENTOR
Jerome Hirshfeld,
BY
ATTORNEY

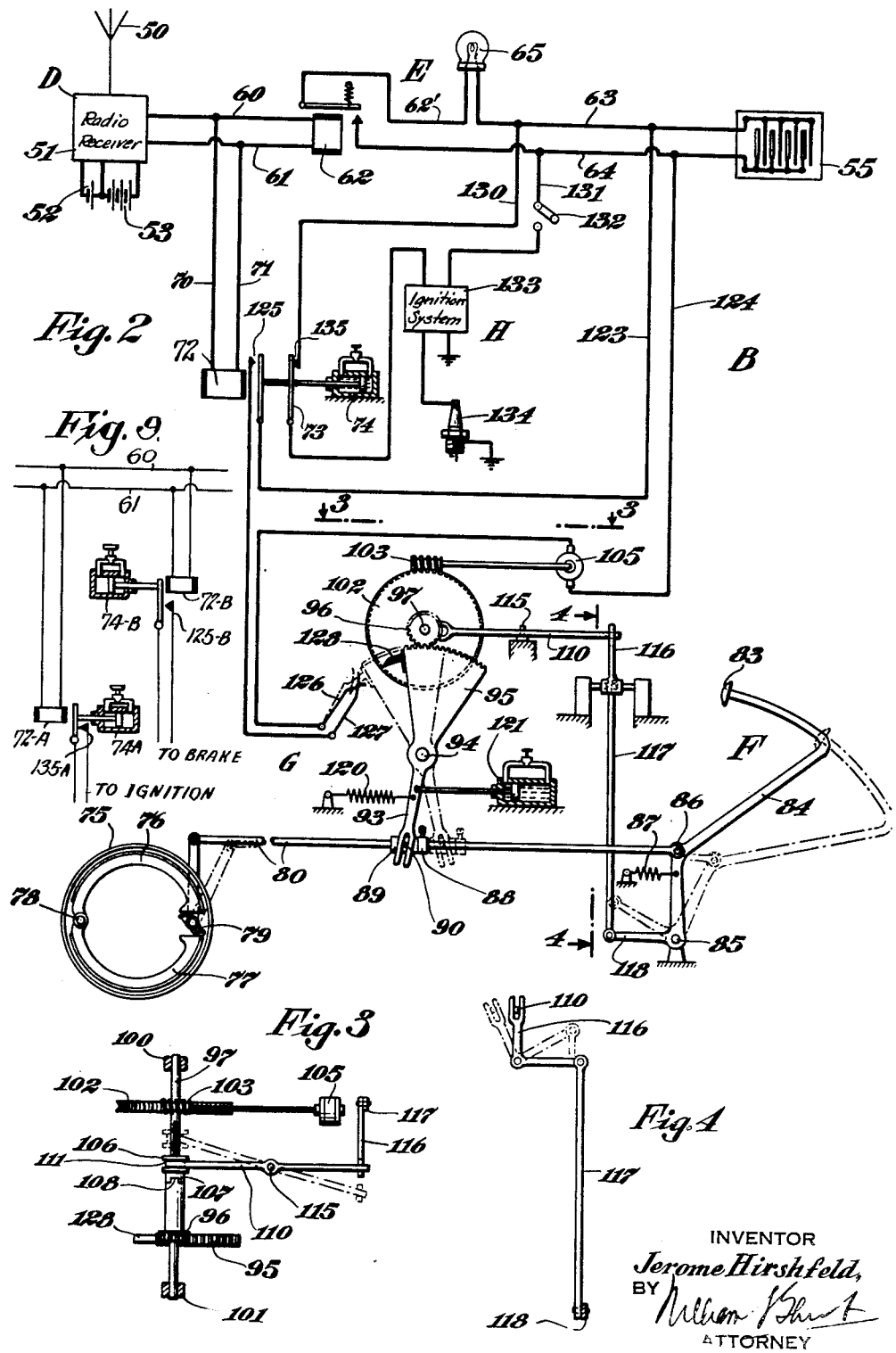

Patented Dec. 24, 1935

2,025,106

UNITED STATES PATENT OFFICE 2,025,106

WARNING SIGNAL AND CONTROL FOR ROAD VEHICLES

Jerome Hirshfeld, New York, N. Y.

Application June 8, 1932, Serial No. 616,036

3 Claims. (Cl. 246—30)

My present invention relates on the one hand to an arrangement for apprising the driver of a road vehicle, or the like, of the fact that he is approaching a danger zone, and coordinately relates either by way of addition, or, as an alternative, to an arrangement whereby the vehicle itself can be automatically controlled if it continues to approach the point of danger.

For purposes of convenience of illustration and as disclosing one of the many applications of my invention, I have illustrated my invention in connection with a railroad crossing and in the application thereof (a) the automatic operation and control is by the presence of a train in the vicinity of a grade crossing; (b) the apprisal to the driver of that fact is by means in the road vehicle, controlled by an arrangement rendered operative by the presence of such a train, and (c) the control of the vehicle is by means similar to those given in (b), except that its operation is directly upon the vehicle, controlling one or more of the operating parts thereof.

More specifically, the embodiment herein disclosed shows an arrangement at the railroad crossing whereby energy either created or controlled by the movement of the train as it approaches or leaves the crossing, is received by an apparatus in the vehicle to control or operate a signal receivable or perceptible by the vehicle driver and/or an arrangement to control one or more of the operating parts of the vehicle.

The general object of my invention is the provision of an arrangement whereby either the driver of a road vehicle may be apprised of danger ahead, or whereby the vehicle may be automatically controlled in the event of such danger, or whereby, in the event that the driver, being informed of the presence of such danger, ignores its import and fails to act, the automatic control of the vehicle goes into effect.

For the attainment of these objects and such other objects as may hereinafter appear or be pointed out, I have illustrated one embodiment of the invention in the drawings, wherein:

Figure 1 shows a railroad crossing with a radio signaling system in conjunction therewith, and further shows two approaching motor cars each carrying a receiving system to be operated by the signaling system;

Figure 2 shows in detail such a receiving system together with the parts of a motor car or other road vehicle, controlled by it, according to my invention;

Figure 3 shows a detail of the brake-operating mechanism, said view taken substantially on line 3—3 of Figure 2;

Figure 4 shows a further detail of the brake-operating mechanism, the view being taken substantially on line 4—4 of Figure 2;

Figure 5 shows a detail of the switch mechanism to be controlled by the motion of a train passing the crossing; or stationary thereon, said view being taken on line 5—5 of Figure 7;

Figure 6 shows a detail of the switch mechanism in cross-section, taken substantially on line 6—6 of Figure 5;

Figure 7 is a cross-sectional view of the switch mechanism taken substantially on line 7—7 of Figure 5; and Figure 8 is a cross-sectional view of the switch mechanism taken substantially on line 8—8 of Figure 5.

Figure 9 shows a modification of a portion of the circuits of Figure 2.

My invention in general consists of a signaling system involving the use of signaling impulses for warning the driver of a motor vehicle of a condition of danger, and such signaling impulses may be sound waves, or some form of radiant energy, such as light or radio waves, these latter being employed in the illustrated embodiment of my invention, in which the signaling station is indicated in general by the letter A, as will be seen from Figure 1. A motor car or other vehicle fitted with my invention will carry a receiving station for the reception of the radiant energy given off by the signalling system A, which, as already stated, in the specific embodiment illustrated, consists of radio waves, and this receiving station is designated generally by the letter B, and shown as applied to motor cars in Figure 1, and in detail in Figure 2.

Referring particularly to Figure 1, the numerals 11 and 12 show a system of tracks at the same level as and crossing a highway 13, this arrangement being customarily known as a grade crossing. While I have shown a double track system, it is to be understood that I may apply my invention to a single track system or to a system of more than two tracks. Trains on track 11 will ordinarily move in the direction shown by the arrows 14, and trains on track 12 will ordinarily move in the direction of arrows 15. A signaling station 20, capable of emitting trains of radio waves is located at one side of the railroad crossing and a similar station 21 is located on the other side of the crossing. In order to prevent the signaling and controlling effects of these stations on vehicles located at too great a distance from them, their energy output is restricted to such an extent that their effectiveness is limited to a comparatively short distance from the stations. By way of suggestion, I may mention a distance of five hundred feet as a practical figure.

These and all similar signaling stations located at other crossings will preferably be operated to emit radio waves at a selected predetermined frequency or wave length which is the same as that to which the receiving apparatus on the motor car or other vehicle is attuned, so that the car will receive signals, when approaching all crossings so equipped, without the necessity of special tuning by the driver.

By having two stations instead of a single central one, economy of operation may be effected by utilizing directional control of the radio waves in such a manner that the waves are directed down the road toward approaching vehicles, and a further advantage of two stations, one on each side of the track, is that the signals cannot possibly be interrupted by passing trains, but it will be understood that a single station centrally or otherwise located or more than two stations, may be used, and with or without directional control of the radiations, wherever found desirable. These radio stations may be operated from the power line 22, controlled by electrical switch mechanisms 25, 26, 27 and 28, each designed to operate when a train passes by it in either direction.

The switches 25 and 26 are arranged to operate in conjunction with two parallel conductors 30 and 31 in such a manner that when a train on track 11 is approaching the crossing, it will, on coming opposite the switch 25, throw the same so as to cause operation of the radio stations 20 and 21. Similarly, switches 27 and 28 are arranged to operate in conjunction with parallel conductors 40 and 41. On referring to Figure 1, it will be noted that radio stations 20 and 21 are connected to power line 22 in parallel, but that the conductors 30, 31, 40 and 41, in conjunction with switches 25, 26, 27 and 28 form a network of parallel connectors bridging a gap between one of the wires 35 of the power line and the conductors 36, 37 branching off to the radio stations 20 and 21 respectively. To effect operation of these stations, it is therefore necessary to establish an electrical path through this network of parallel conductors, and this will be effected if switches 25 and 26 introduce either conductor 30 or 31 into the circuit, or if the switches 27 and 28 act similarly on either one of conductors 40 and 41.

Without going into the details of the construction of switches 25, 26, 27 and 28, as this will be described later, it will suffice for the present to state that the switch 25 is constructed so that it will always make contact either with one or the other of the parallel conductors 30 and 31, and the same is true of switch 26, which may be of a construction identical with that of 25 and is further so related to the same that, as long as no train is located between switches 25 and 26, these switches are connected each to a different conductor, so that there is here a break in the line 35, which must be bridged before current can pass to the radio stations 20 and 21. Switches 27 and 28 are similarly constructed and relatively adjusted, so that, unless a train is located between the sections of tracks 11 and 12 bounded by stations 25, 26, 27 and 28, the radio stations will be silent. This will be clear on reference to Figure 1.

If now a train on track 11, going in the direction of arrow 14 approaches switch 25, which is in the full line position in Figure 1, and passes the same, the latter is so constructed that, by a suitable operating device on the train, as will be described later, the switch is thrown out of contact with the one conductor (31, in the position illustrated in Figure 1) and into contact with the other conductor 30. The result is that switch 25 will now be in the dotted line position of Figure 1, and switch 26 in the full line position, so that current may pass from conductor 35, through switches 26 and 25, and conductor 30 into the radio signaling stations 20 and 21, it being remembered that the other side of the power circuit 22 has at all times an uninterrupted connection with these stations.

As the train proceeds toward switch 26, there is no change in the electrical connections, but as it passes the switch 26, the same is thrown into the dotted line position of Figure 1, and the power line connection is again broken, so that the signaling stations become silent. The same result would, of course, be attained if the train, after throwing switch 25, stops, and instead of continuing toward switch 26, backs away from same, and again passes switch 25. In this case, switch 25 would be thrown back into the full line position of Figure 1.

If a train on track 11 approaches from the left of Figure 1 and passes switch 26, it is obvious that this would establish the power connection, in fact, it will be clear that no matter what the direction of approach of a train, it will cause operation of the stations 20 and 21 as soon as it enters the section of track 11 located between switches 25 and 26.

The operation of switches 27 and 28 in relation to track 12 is identical with the above-described operation of switches 25 and 26 in relation to track 11, and since these two systems of circuits are in parallel, they effect the desired condition of operativeness of the radio stations 20 and 21 as long as there is a train within the danger zone adjacent the crossing, and non-operativeness of the stations when there is no train in the zone.

I will next describe the receiving station B, carried individually by each motor car or other road vehicle, which will be found illustrated in Figure 2. In this figure, D represents a radio-receiving set embodying an antenna 50, and the receiver 51, tuned to receive signals from stations 20 and 21, which receiving set is furnished with suitable electric batteries 52 and 53 as needed for its operation. It will be understood that this set may be of any type which will furnish sufficient power to operate the relays necessary for actuating and controlling the several alternative systems of control described in connection with my invention, and for this purpose may be provided with such power amplifying adjuncts as may be needed.

The controls on the motor vehicle provided in connection with the signals received from radio stations at the crossing are, first of all a visible signal system designated by E, an automatic control for the ignition designated collectively by H, an automatic control for the braking system designated collectively by G, and the customary foot-operated braking system designated collectively by F. Power for operating the various devices E, H, and G, is provided by the storage battery 55, such as is ordinarily carried by motor cars for furnishing the power necessary for starting the motor and for ignition, making due allowance for any additional power needed. Conductors 60 and 61 transmit the feeble current from radio receiver D to a relay 62, which forms part of the visible signaling system E. The relay closes the storage battery circuit, comprising suitable conductors 62', 63 and 64, and the signaling lamp 65, which may be any type of incandescent lamp suitable for storage battery operation. The effect of the reception of signals from stations 20 and 21 is therefore to operate the relay 62, so that by means of the connections described the signal lamp 65 is operatively connected to the storage battery, whereby the driver of the motor car or other vehicle is visually apprised of the vicinity of the radio stations and of the grade crossing. As soon as the sending stations cease their operation, the current in conductors 60 and 61 is also discontinued, and the relay automatically opens the signal lamp circuit.

Conductors 70 and 71 branching off from the above-mentioned conductors 60 and 61, conduct the weak current from the receiving set into a retarded or time relay 72, the retarding action of which may be effected by a dash pot arrangement 74, which, as disclosed in Figure 2, operates to control both the ignition system F, and the automatic brake control system G, by the double switch member 73. While I have shown a single relay for this purpose, it is also possible to use separate retarded or time relays, one for the ignition system H, and the other for the brake control system G, and if two relays are provided, different periods of retardation may be used for these two systems, and further, if desired, one may then be disconnected, while the other is left in operation, or both may be operated simultaneously. The dashpot 74 is shown in Figure 2 as of the adjustable type in which an adjustable valve interposes more or less resistance to the flow of fluid from one side of the piston of the dashpot to the other, and by suitable setting of this valve the period of retardation effected by the dashpot may be predeterminedly controlled. The relay 72 is preferably set to retard its operation for a short time, say, for instance, ten seconds. If separate relays are used for the ignition and the brake control systems, different periods of retardation may be assigned to each. For example, the ignition may be made operative after a delay of ten seconds, and the brake control system after a delay of fifteen seconds, the advantage of this being, of course, that less power will be needed to operate the brakes since the effect of throwing off the ignition first will be to cause the motor itself to act as a brake. The relay 72 and the switches it operates are constructed so that when the relay circuit is no longer energized, the relay and the switches will return to their normal position. This may be effected in any suitable or preferred manner, such as by springs as shown in connection with relay 62 but has been omitted from the drawings for the sake of clearness.

Figure 9 shows the circuits for a system in which the ignition and the brake are separately controlled. For controlling the ignition, a relay 72—A, energized from the line 60, 61, the action of which is retarded by the adjustable dash-pot arrangement 74—A, to control the action of switch 135—A, is used. Similarly for the brake circuit a relay 72—B with dash-pot 74—B controls switch 125—B. It is to be understood that the construction of relays 72—A and 72—B and their associated parts is similar to that of relay 72 and its associated parts.

Omitting for the present the operations of the ignition system H, and the brake-control system G, the foot-brake control mechanism F will next be described. This may consist, as customary, of a brake drum 75, adjunctive to the wheels of the vehicle, and brake shoes 76 and 77 pivoted at 78 and spread by a cam 79, actuated by a brake rod 80. A brake pedal 83 attached to brake lever 84 fulcrumed at 85, acting on the brake rod 80, through the pivotal connection 86, and drawn into its inoperative position by a spring 87, forms the operating control for the system. Brake rod 80 carries a collar 88 fixed thereto and also a sliding collar 89 carrying pins 90, whereby it may be engaged by forked lever 93, pivoted at 94 and carrying at its upper end a toothed segment 95.

The function of these last-mentioned parts, which form part of the automatic braking system G, will next appear. It will be obvious that when the operator steps on pedal 83 the brake rod 80 will move forward, carrying with it the collar 88, and the latter may move forward without disturbing the position of sliding collar 89. On the other hand, if collar 89 moves forward, or to the right as shown in dotted lines in Figure 2, it will, owing to its contact with fixed collar 88, push the brake rod 80 to the right and so lock the brakes, while at the same time it is free to return to the unlocked position, as shown in Figure 2, in full lines, without having any effect on the brake pedal.

Proceeding with the description of the automatic brake operating system G, and calling attention to Figures 2, 3, and 4, rack 95 is engaged by a toothed pinion 96, carried loosely on wormwheel shaft 97, which is journalled in suitable bearings 100 and 101, and carries in fixed relation thereto the worm-wheel 102. The latter is engaged by a worm 103 carried on an extension of the shaft of a motor 105. Slidably keyed to the shaft 97 is a clutch member 106, which may be actuated to cause contact between clutch teeth 107 formed on 106 and clutch teeth 108 carried by an extension of the hub of pinion 96. The clutch member 106 is actuated from the brake pedal for this purpose by a system of levers, such as lever 110, engaging a groove 111 in clutch member 106 and pivoted at 115, and operated by bell-crank lever 116, motivated through link 117 from an extension 118 of the brake lever 84.

The mechanism so far described operates in the following manner: As long as the brake pedal is in the upper or off position, the clutch teeth 107 and 108 will be in engagement and consequently, if power is applied to the motor 105, the same will actuate the worm 103 and through it the system comprising the worm-wheel, pinion and toothed rack 95, so that, by continued operation of the motor the rack 95 will be caused to move to the left in Figure 2, as indicated by the dotted line, and the collar 89 will move forward, thus actuating the brake rod and the brake shoes and stopping the vehicle. Owing to the fact that the worm 103 and worm-wheel 102, because of the peculiarities of their construction, cannot be run in the reverse direction by pressure applied on rack 95, the system will be locked against backward movement, even though the power be removed from the motor 105.

If, however, the operator steps on the pedal 83, he will effect a disengagement of clutch teeth 107 and 108, which has the effect of disconnecting the worm 102 from the rack 95, thereby destroying its locking effect. The rack 95 is therefore free to move back into its initial position as shown in full lines in Figure 2, and this backward movement is effected by a spring 120. The speed of return of rack 95 is moderated by a dashpot arrangement 121 by which too violent action will be avoided. The motor 105 is operated from the storage battery 55 through conductors 123, 124 branching off, as shown, from conductors 63 and 64. One of them, as conductor 123 may, for the purpose of stopping motor 105 be interrupted at two places, by contact making and breaking devices, the first of these being a switch 125 contact 125 cooperating with switch member 73, operated by the relay 72, and the second being the spring contacts 126 and 127, contact between which is interrupted by the passage between them, when the rack 95 has reached the braking position, of a wedge 128 of insulating material carried by the rack. When the rack reaches this position, the motor power is no longer needed and is, in fact, undesirable.

The operation of the automatic brake control system G will now be described. When energy is received from the stations 20 and 21, the feeble current induced in the radio receiver is transmitted to retarded relay 72 previously mentioned. The operation of the relay closes the switch 125 a given interval of time after the relay is energized, which interval may be ten seconds, as previously suggested by way of example. Closing of the switch will have the effect of starting the motor 105 which will actuate rack 95 and cause it to move into the dotted line position of Figure 2, until the motor circuit is interrupted by the spreading of contacts 126 and 127. When that happens the motor stops, but this does not occur before the brakes are locked. The brakes will stay locked until the operator steps on the pedal 83 and by the action already described, releases the rack 95.

It will further be noted that if the operator should step on the pedal 83, before the automatic control begins to act, in other words, if the operator intentionally throws on the brakes, the effect will be to prevent the operation of the automatic control because the motive power is disconnected from rack 95 owing to breaking of the operative connection between clutch teeth 107 and 108.

There remains to be described, among other things, the ignition system H and its control. The ignition system is operated, as customary, from the storage battery 55. For this purpose, conductors 130 and 131 branch off from conductors 63 and 64 and the complete circuit embodies a manually operated switch 132, as customarily provided in ignition circuits, and a device or set of devices collectively indicated at 133, for properly timing the ignition impulses and distributing them to the different spark plugs, and providing the proper electrical tension. A system of spark plugs indicated at 134 is energized from 133 in the customary manner.

The automatic feature of the ignition system H consists of a contact 135, cooperating with switch member 73, whereby the ignition circuit is automatically opened on the operation of the retarded or time relay 72, but as previously described, if found desirable, a separate relay may be used for this purpose and the period of retardation in its action may be different from the retarded action of the brake control system.

Referring now to Figures 5, 6, 7 and 8, these figures disclose the details of the switch mechanism 25, and the actuating means for same carried by a train in the form which has been selected for illustration. It will be understood that the switches 25, 26, 27 and 28 would usually be and in the specific disclosure are intended to be, all of the same construction.

For operating these switches, I may provide a lever 141 carried by one of the cars 140 of a train and adapted to engage in notches 142 of a cam wheel 143, mounted on a shaft 144, journalled in casing 146 of switch 25, which casing is preferably weather-proof, for obivous reasons. Carried on this shaft in spaced relation are two contact or controller drums 150 and 151, insulated from shaft 144 by insulating bushings 152, and the cylindrical surface of each of these drums is divided into four equal portions by two insulating segments 153, carried on opposite sides thereof. The body of each drum 150 or 151 is made of conducting material, so that when brushes 155 and 156 located on opposite sides of drum 150, and suitably insulated from the framework, are in contact with the insulating segments 153, current cannot pass through the drum, but when the brushes are in engagement with the intermediate or conducting portions of the drum, electrical connection is established between the two brushes. Similarly, the brushes 157 and 158, also suitably insulated from the frame, make contact with drum 151.

It will be noted that passage of a train in either direction will cause cam wheel 143 and the attached contact drums to move through a quarter revolution, whereby each contact drum alternately makes and breaks the electrical connection between the pair of brushes associated with it. To avoid accidental displacement of the wheel 143 from relative position with respect to the other switches, which of course, is necessary for the proper operation of the system, a ratchet arrangement may be provided in connection therewith which will prevent its turning on the application of ordinary accidental or other undesired impacts, but will not resist its motion on the passage of a train.

It will further be noted that drum 151 is displaced, as regards the position of the insulating and conducting portions of its surface, by a quarter revolution with relation to drum 150, so that when the brushes on 151 are on the insulating segments, the brushes on 150 will be on the conducting portions. The brushes 157 and 155 on one side of the cam wheels 150 and 151 are connected in multiple to conductor 35 and the opposite pair of brushes 157 and 158 are separately connected respectively to conductors 30 and 31. From this description, it will be clear that the system of contact drums described establishes contact between conductor 35 and either conductor 30 or 31, but never with both together, and each passage of a train in either direction shifts the connection from one of the conductors 30 or 31 to the other.

It will now be seen that when a road vehicle such as a motor car approaches the grade crossing from any direction, and no dangerous condition, such as the presence of a train on that portion of the track system adjacent the crossing and limited by the location of the system of switches, exists, he will receive no signal of any kind, nor will his vehicle be controlled in any way and he will therefore be free to cross the tracks. As soon, however, as a train enters within the above defined zone, or if a train should be located within the above zone while the vehicle is approaching, and as soon as the vehicle enters the region within which the radio emanations become effective on the radio receiving means carried by the car, the driver will be warned by the signal lamp 65 that it is time for him to stop. If he disregards this signal and proceeds nevertheless, an automatic action takes place which results in throwing off the ignition and simultaneously throwing in the brakes. In the alternative form described, the ignition is thrown off first and the brakes subsequently. This delayed action between the operation of the signal and the cutting off of the ignition and throwing in of the brakes is effected by the retarded or timed relay 72 as previously described. When the dangerous condition has ceased to exist, the radio signaling stations no longer function, and the result of this is that the relays operating the signaling system and the ignition and braking mechanisms return to their original inactive position. The signal therefore ceases to operate, and the ignition system is again energized. The braking system, however, will stay locked on account of the locking action of the worm-wheel system 102 and 103. In order to release the brakes, it is necessary for the driver to step on the brake pedal 83, whereby the worm and worm-wheel are thrown out of the system of brake control, and after the brake pedal is again released, the brake control mechanism returns to its original position, again ready for automatic operation. Owing to the retraction of the insulated wedge 128 when rack 95 moves to its initial position, the spring contacts 126 and 127 again come together, and permit the motor 105 to operate, when this is made possible by the action of the relay 72.

It will be noted that foot operation of the brakes is at all times possible quite independently of the automatic brake control.

It will be understood that I do not limit myself to the exact details of the various mechanisms illustrated, as these are shown only by way of illustration, and are capable of modification in a great variety of ways to suit particular conditions such as will readily suggest themselves to those skilled in the art. For example, while I have shown the switch 25 as operated by a special contact lever located on the train, switches or other mechanisms not operated by such contact levers may be used. By way of example, means operated by the pressure of the wheels of the train on the track or on means associated with the track, may be substituted without in any way changing the operation of my system.

Having thus described my invention and illustrated its use, what I claim as new and desire to secure by Letters Patent is:

1. In combination with the foot brake mechanism of a motor vehicle, comprising a foot pedal operating the brake mechanism through a brake rod, and means adapted to release the brakes when the foot pedal is released, an automatic braking system operative in response to predetermined danger conditions external to the vehicle, a member slidable on said brake rod, stop means on said rod to limit the motion of said slidable member in one direction but not in the other, whereby actuation of said slidable member may serve to set the brakes but not to release them, motor means, power transmission means acting through a clutch to transmit motive power from said motor means to said slidable member so as to actuate the same to set the brakes, means for operating said clutch so as to interrupt the transmission of power from said motor means to said slidable member, said means being in operative relation to the foot-pedal so as to perform its power-interrupting function when the pedal is operated to set the brakes, and means operative in response to predetermined power conditions external to the vehicle to cause said motive means to become operative.

2. In mechanism as defined in claim 1, means to interrupt the operation of said motive means when said slidable member has caused a setting of the brakes.

3. In mechanism as defined in claim 1, means to cause said slidable member automatically to assume an inoperative position in relation to brake setting.

JEROME HIRSHFELD.